Oct. 18, 1955  E. PRATI  2,720,849
CARGO SPACE ADJUSTING MEANS
Filed Nov. 10, 1951  2 Sheets-Sheet 1
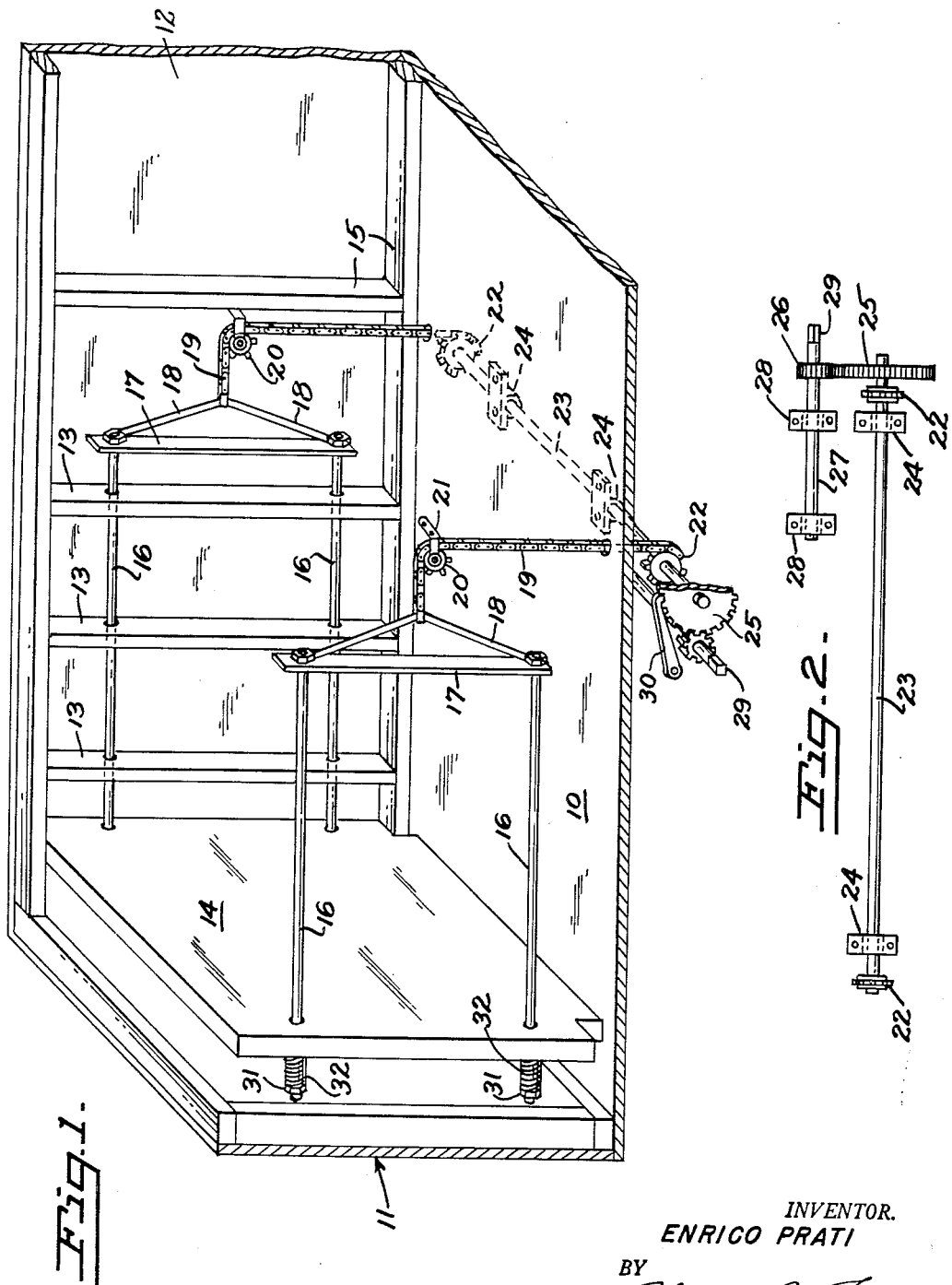
INVENTOR.
ENRICO PRATI
BY
Charles M. Fryer
ATTORNEY Oct. 18, 1955
E. PRATI
2,720,849
CARGO SPACE ADJUSTING MEANS
Filed Nov. 10, 1951
2 Sheets-Sheet 2
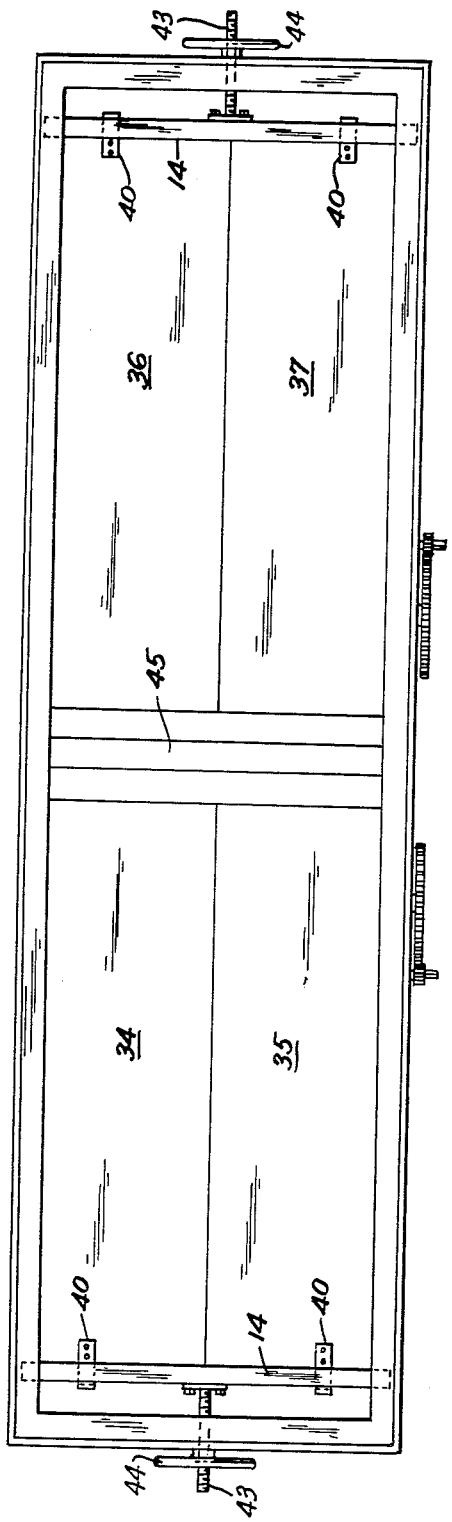
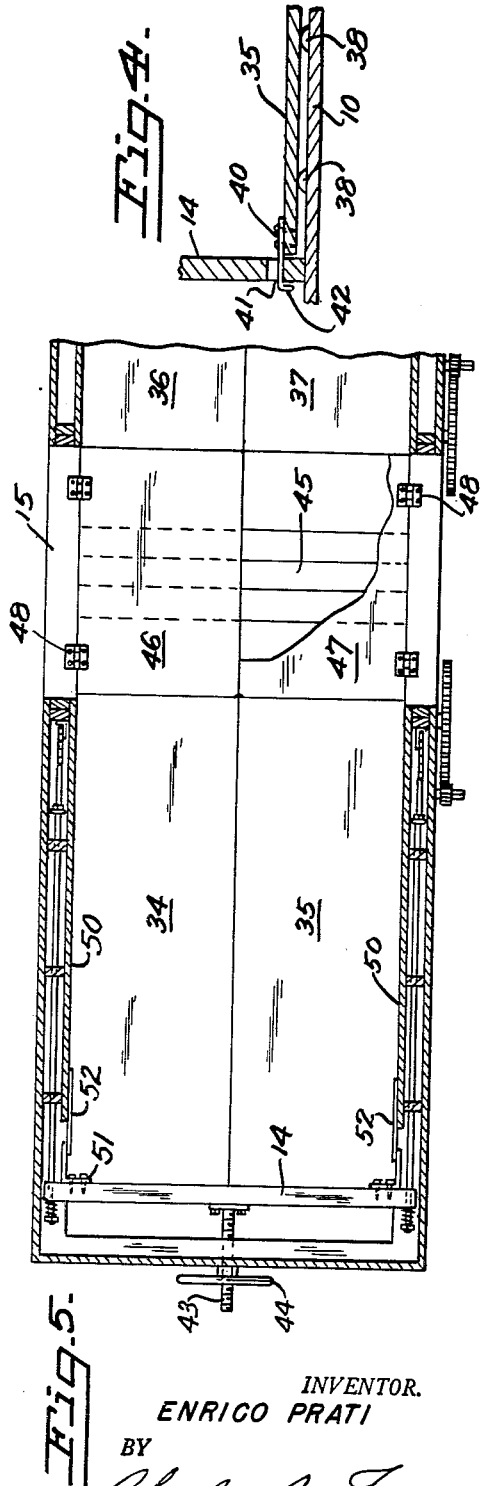
INVENTOR.
ENRICO PRATI
BY
Charles M. Frye
ATTORNEY

United States Patent Office 2,720,849
Patented Oct. 18, 1955

2,720,849

CARGO SPACE ADJUSTING MEANS

Enrico Prati, Asti, Calif.; Edward Prati, executor of said Enrico Prati, deceased Application November 10, 1951, Serial No. 255,841

4 Claims. (Cl. 105—369)

This invention relates to cargo space adjusting means and particularly to means for adjusting or compressing a load in such space after loading and before transit to prevent shifting and damage of the load while it is in transit.

In my Patent No. 2,548,057, issued April 10, 1951, and entitled "Carload Adjusting Means," I have disclosed the combination with a cargo space such as the interior of a freight car of means for compressing the load therein comprising a mechanically operated pusher plate at one end of the space and a plurality of movable floor racks supporting the load in separately adjustable sections. Cars constructed in this manner have demonstrated success of the apparatus in protecting loads in transit by compressing the loads to such an extent that individual packages that make up the load cannot become misplaced and crushed to initiate destruction of the major portion of the entire load. The present invention relates to the elimination of the same problems that were sought to be corrected in the invention of the above mentioned patent by a somewhat simpler and less costly mechanism. This invention is shown and described herein as applied to a freight car but is readily adaptable to use in connection with the cargo space of any carrier such as a ship, plane or truck and its adaptability thereto will be apparent from an understanding of the following description.

It is an object of the present invention to provide a cargo space adjusting means or a cargo compressing means operable through relatively simple and inexpensive structure to adjust or compress a cargo before transit and to provide resilient means at two opposite sides or ends of the cargo to serve as a buffer for absorbing shock in transit. Further and more specific objects and advantages of the invention are made apparent in the following specification wherein the invention is described in detail by reference to the accompanying drawings.

In the drawings:

Fig. 1 is a simplified perspective view of one-half of a freight car body with the top and one side removed to disclose the application of a pusher plate and operating mechanism therefor disposed within the car and constructed in accordance with the present invention, Fig. 2 is a plan view of a part of the operating mechanism through which the pusher plate shown in Fig. 1 is advanced toward the center of the car, Fig. 3 is a plan view of a freight car body with the top removed showing the assembly therein of pusher plates and floor racks constructed in accordance with the present invention, Fig. 4 is an enlarged fragmentary sectional view illustrated in the manner of supporting the floor racks in the manner of connecting the floor racks with the pusher plate, and Fig. 5 is a fragmentary horizontal sectional view through a portion of a freight car including the cargo space adjusting means of the present invention.

Generally speaking, the invention comprises a movable wall or pusher plate disposed one at each of two opposite ends of a cargo space and means for advancing these pusher plates toward each other to reduce the space in which the cargo is loaded and thereby prevent undo shifting of the cargo in transit. Since many cargoes which are destructable such for example as glass containers in corrugated paper cartons are likely to be crushed by such a space reducing means, the invention also comprises floor racks movably supported preferably on anti-friction means which racks overlie the main floor of the cargo space and support the cargo to facilitate its movement under influence of the pusher plates.

In Fig. 1 of the drawings, a portion of a box car is shown as having a floor 10, an end wall generally indicated at 11 and a side wall 12 which includes conventional structural members such as the vertical stud-like parts 13. Within the car and adjacent the end thereof is a pusher plate 14 preferably substantially as large as the end of the car itself but free of direct connection with the car so that it may be advanced toward the center of the car where the entry doors are disposed as indicated by the reference character 15. Identical pusher plates 14 are disposed at opposite ends of the car as illustrated in Fig. 3 of the drawings and each is provided with an identical mechanism for advancing it toward the center of the car, such mechanism being shown in Fig. 1.

In Fig. 1, the inner wall panels of the car have been removed and the ends of the pusher plate 14 are shown as projecting into the space occupied by the studs 13 between the inner and outer wall panels. On each of its edges and disposed within this space, pairs of rods 16 are illustrated as extending through the pusher plate and secured thereto by means presently to be described. These rods extend through the studs 13 toward the central part of the car and their ends are connected as by a spanner plate 17 and a bridle 18 to which a chain 19 is secured. The chains 19 pass over sprockets 20 secured as by brackets 21 to one of the vertical frame members of the car and then pass downwardly through the floor of the car for connection with a sprocket 22. The sprockets 22 are carried by a shaft 23 to which they are fixed against rotation and the shaft 23 is supported in bearings such as indicated at 24 in Fig. 2 which may be secured by any suitable means to the under side of the car floor 10. A reduction gearing is employed for rotating the shaft 23 and includes a large gear 25 fixed on the shaft and a small gear 26 fixed on a counter shaft 27. Bearings 28 support the counter shaft with relation to the car and the end of the counter shaft is squared as shown at 29 for the application thereto of a ratchet wrench or if desired, any suitable power actuated mechanism for imparting rotation thereto. Rotation of the shaft 27 will, through the gearing described, rotate the shaft 23 and sprockets 22 thereon to pull on the chains 19 and advance the pusher plates toward the center of the car. Since the advancing movement is a relatively short distance, that is usually less than one foot, the sprockets 22 may be of a size to impart this movement to the pusher plates without wrapping the chain around the sprockets for more than a partial turn. Any suitable latching mechanism such for example as a pawl indicated at 30 in Fig. 1 may be employed for preventing reverse rotation of the gear 25 and shaft 23. I have shown the rods 16 as relatively long with the sprocket 20 located on the heavier studding adjacent the access opening 15. These rods, however, may be considerably shorter if desired so that they extend through only one of the studs 13. With such an arrangement the chains and operating mechanism would be disposed closer to the end of the car.

Where the rods 16 extend through the pusher plate 14, their ends are provided with suitable enlargements or nuts such as indicated at 31 and springs 32 are interposed between the enlarged ends of the shafts and the pusher plate to provide a cushioning or shock absorbing effect and to permit the entire compressed load to float or shift slightly in an endwise direction in the car. This floating protects the load against sudden shock so often occasioned in making up trains or humping cars.

Since it is often impossible to compress or compact a load by pushing on either one or both ends thereof without damaging the individual units in the load, it is desirable that the load be supported on movable floor racks which are shown as four in number and indicated by the reference characters 34, 35, 36 and 37 in Fig. 3 of the drawings. These racks may be supported on rollers as shown in my Patent No. 2,548,057 or preferably on half round bars, which extend transversely of the car floor as indicated at 38 in Fig. 4, and serve as anti friction members to facilitate movement of the racks. The floor racks function in pairs inasmuch as the racks 34 and 35 move as a single unit as do also the racks 36 and 37. However the smaller sections shown are easier to handle as for example when it becomes necesary to remove them for cleaning the car floor or for other reasons. They may, however, be temporarily bolted or otherwise joined at their abutting edges by means not shown if desired.

It is also desirable that the floor racks be connected with the pusher plates 14 because retraction of the pusher plates 14 prior to unloading a car is preferably accompanied by retraction of the load in two half sections away from the central portion of the car where the access doors are provided. Thus each floor rack has a hook plate such as illustrated at 40 in Fig. 4 adapted to extend through a slot 41 in the pusher plate 14 and having a downwardly depending end 42 engaged upon retraction of the pusher plate to also retract the floor rack. In order to effect retraction of the pusher plates and thereby loosening of the compressed load to enable it to be removed from the car, each plate has a threaded shaft 43 secured centrally of its outer or back surface and extending through the end 11 of the car. A hand wheel 44 is threaded on the shaft 43 and upon being rotated will, through its threaded connection, retract the shaft and pusher plate.

A supporting member is shown as a timber 45 extending transversely of the car floor and centrally thereof. Steel plates shown at 46 and 47 in Fig. 5 may be employed centrally of the car to cover the ends of the floor racks and to overlie the space between them to provide a substantially smooth or uninterrupted loading surface. These plates are supported between the racks by the timber 45 and if desired, may be secured as by hinges shown at 48 to the sills of the access openings 15. The ends of the racks should always stop short of contact with the timber 45 to insure the desired floating action. The plates permit free movement of the floor racks and, of course, in transit, the hand wheel 44 will be loosened on the shafts 43 to permit some movement of the load against the resiliency of the shock absorbing springs 32. In Fig. 5 of the drawings, the car is shown as provided with inside wall panels 50 and since these panels cannot be continued into abutting relation with the pusher plates 14 when the plates are retracted, angular metal plates 51 are secured to opposite sides of the pusher plates in vertical positions and have portions underlying metal plates 52 secured to the wall panels 50, as shown, to prevent pinching or crushing of any part of the load as the plates 14 are advanced. Since the plates 52 are constructed of thin sheet steel or similar material, they will have little tendency to interfere with the cargo when it is moved. The edges of the plates 52 may be beveled if desired to further insure against their obstructing movement of the cargo.

In operation, the car is loaded from its opposite ends; the first articles being placed against the pusher plates 14. As the two parts of the load approach the center of the car leaving but a small central space unloaded, the pusher plates are advanced inwardly by the means disclosed, thus closing the central space and also compacting the load by decreasing or taking up the small spaces existing between individual cartons or parts. Thus the greater part of the compacted load in the decreased cargo space is supported on a movable floor and between movable end walls which are in effect all joined together but capable of slight floating movement in an endwise direction relative to the car and limited by the buffer springs 32. The cargo is, therefore, not only protected against relative shifting of its several parts, but since it may shift slightly as a mass with respect to the cargo space, it is also protected against the severe shocks to which it is sometimes subjected in transit.

The pusher plates and floor racks are illustrated herein as simple panels. It is to be understood, however, that they may be fabricated of structural beams and covered with sheet metal or the like to afford lightness and strength.

I claim:

1. A cargo space adjusting means which comprises plates disposed adjacent opposite walls of the cargo space, means for advancing said plates toward each other to compress cargo disposed between them, resilient means interposed between the plates and the advancing means to enable limited floating of the compressed cargo in transit, floor racks connected with said plates and supported for movement relative to the floor of the cargo space to support the cargo and facilitate such floating and means for retracting said plates to enable unloading of the cargo.

2. A cargo space adjusting means which comprises plates disposed adjacent opposite walls of the cargo space, means for advancing said plates toward each other to compress cargo disposed between them, resilient means interposed between the plates and the advancing means to enable limited floating of the compressed cargo in transit, floor racks supported for movement relative to the floor of the cargo space to support the cargo and facilitate such floating, means for retracting said plates to enable unloading of the cargo and means connecting some of the floor racks to each of the plates to cause them to be retracted with the plates.

3. A cargo space adjusting means comprising pusher plates disposed adjacent opposite walls of the cargo space, floor racks movable relative to the floor of the cargo space and connected to the pusher plates, means to move the pusher plates and their respective racks toward and away from each other, and separate floor plates overlying the adjacent ends of the floor racks.

4. A cargo space adjusting means which comprises pusher plates disposed adjacent opposite walls of the cargo space, rods extending from the edges of said plates, chains connected with said rods, sprockets for directing said chains to positions below the floor of the cargo space, and gear means connected with the chains to apply tension to them for advancing the pusher plates toward each other to compress cargo disposed between them.

References Cited in the file of this patent

UNITED STATES PATENTS

| 1,166,354 | Cutler et al. | Dec. 28, 1915 |
| 1,304,023 | Coleman | May 20, 1919 |
| 1,358,724 | Gallup | Nov. 16, 1920 |
| 1,506,462 | Thompsom | Aug. 26, 1924 |
| 2,194,922 | Walsh | Mar. 26, 1940 |
| 2,258,780 | Loney | Oct. 14, 1941 |
| 2,494,004 | Rydner et al. | Jan. 10, 1950 |
| 2,575,751 | Donnelley | Nov. 20, 1951 |